(12) United States Patent
Mathys

(10) Patent No.: US 9,914,806 B2
(45) Date of Patent: Mar. 13, 2018

(54) AGGLOMERATED RUBBER PARTICLES AND METHOD OF PREPARING

(71) Applicant: EMERALD SPECIALTY POLYMERS, LLC, Akron, OH (US)

(72) Inventor: Jeffrey A. Mathys, Brecksville, OH (US)

(73) Assignee: EMERALD SPECIALTY POLYMERS, LLC, Akron, OH (US)

( * ) Notice: Subject to any disclaimer, the term of this patent is extended or adjusted under 35 U.S.C. 154(b) by 0 days.

(21) Appl. No.: 15/265,993

(22) Filed: Sep. 15, 2016

(65) Prior Publication Data

US 2017/0073476 A1  Mar. 16, 2017

Related U.S. Application Data

(60) Provisional application No. 62/218,723, filed on Sep. 15, 2015.

(51) Int. Cl.
| | | |
|---|---|---|
| *C08C 1/08* | (2006.01) | |
| *C08J 3/16* | (2006.01) | |
| *C08J 3/215* | (2006.01) | |
| *C08L 9/10* | (2006.01) | |

(52) U.S. Cl.
CPC ............... *C08J 3/16* (2013.01); *C08J 3/215* (2013.01); *C08L 9/10* (2013.01); *C08J 2309/10* (2013.01); *C08J 2381/08* (2013.01); *C08L 2201/52* (2013.01)

(58) Field of Classification Search
CPC ................. C08J 3/16; C08J 3/215; C08L 9/10
See application file for complete search history.

(56) References Cited

U.S. PATENT DOCUMENTS

| | | |
|---|---|---|
| 3,551,370 A | 12/1970 | Dalton |
| 3,558,541 A | 1/1971 | Dalton |
| 5,336,720 A * | 8/1994 | Richards ................... C08C 1/07 525/193 |
| 5,468,788 A * | 11/1995 | Kulich ...................... C08C 1/07 523/335 |
| 5,847,050 A | 12/1998 | Toritani |
| 6,080,803 A | 6/2000 | Claassen et al. |
| 2016/0240279 A1* | 8/2016 | Shigeta .................... C08K 3/04 |

* cited by examiner

*Primary Examiner* — Hannah Pak

(74) *Attorney, Agent, or Firm* — Hudak, Shunk & Farine Co. LPA

(57) ABSTRACT

A synthetic latex composition, comprising rubber particles, natural surfactants, a novel acid stable surfactant and water for use in agglomeration processes. The invention is also directed to a reproducible method for preparing agglomerated latex particles to control and achieve particle size targets within a specified range and distribution, by utilizing the inventive latex composition and process conditions, but without the use of elevated temperature, pressurization or mechanical agitation of prior art processes.

10 Claims, 1 Drawing Sheet

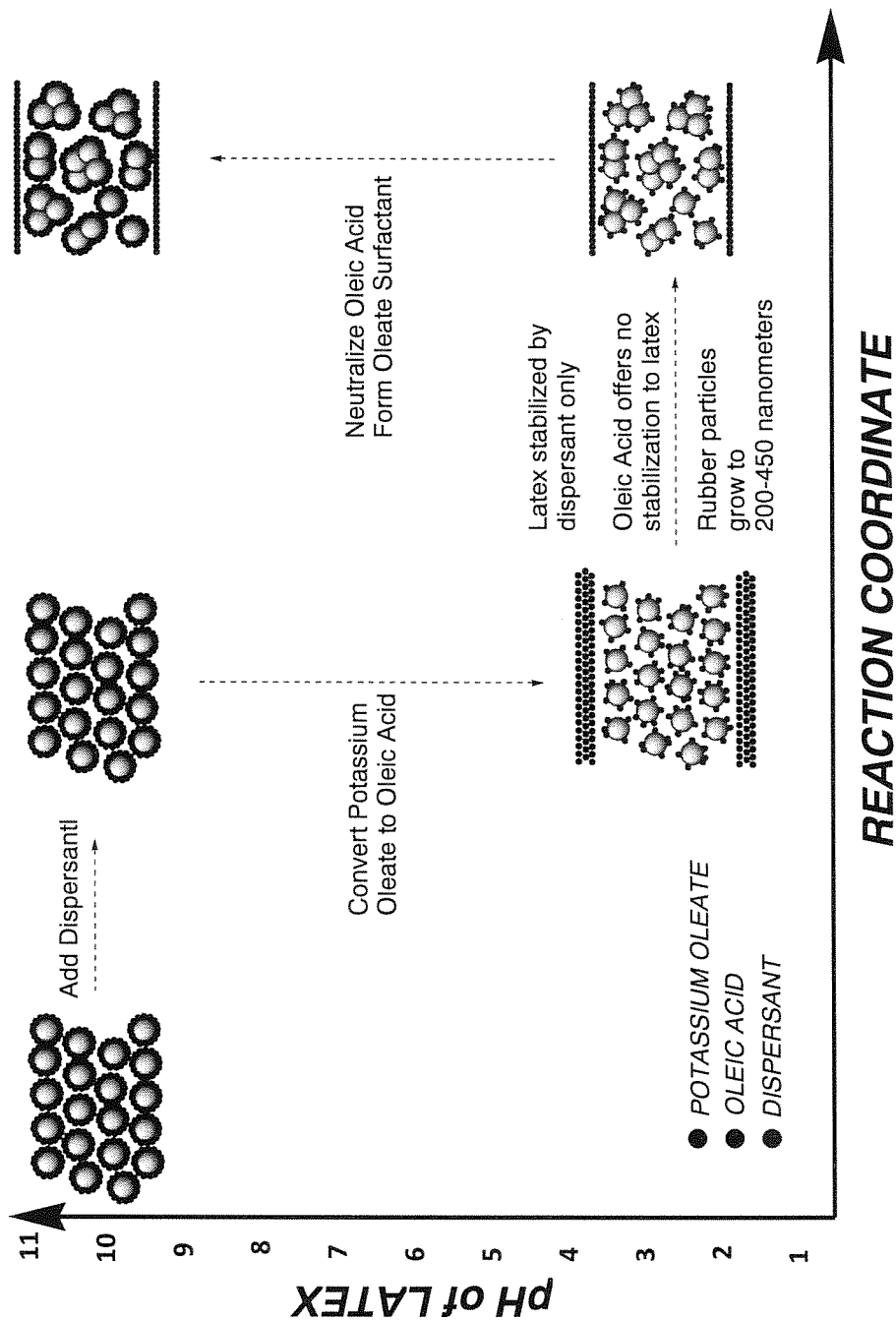

AGGLOMERATED RUBBER PARTICLES AND METHOD OF PREPARING

FIELD OF THE INVENTION

The present invention is directed to a composition useful for preparing agglomerated latex compositions, comprising rubber particles, surfactants and water. The invention is also directed to a method for preparing agglomerated latex particles to control and achieve average particle size targets within a specified range, by utilizing specific surfactants and process conditions that reduce or eliminate the formation of undesired coagulum in the final emulsion. The present invention also relates to agglomerated latex compositions prepared according to the method of the invention and their use in various applications.

BACKGROUND OF THE INVENTION

It is well known that polymerization of latex monomers via conventional emulsification processes results in smaller particle size rubber (latex) emulsions. The process involves introducing an oil (surfactant) into water which results in the production of micelles or bilayers. Ethylenically-substituted monomers migrate into the interior portions of these micelles or bilayers. The monomers may subsequently undergo radical polymerization to produce nanometer size particles that are stabilized as emulsions by the associated surfactants.

Traditionally, it is deemed desirable to have larger rubber particles for use in the production of resins to achieve enhanced impact strength, among other desirable properties in a final product. Hence, processes were developed to "agglomerate" smaller rubber particles into larger particles for use in a variety of applications. Typical latex emulsions having small rubber particles may be agglomerated to larger rubber particles using a number of different processes, e.g., freeze, chemical, pressure, and mechanical agglomeration.

Known chemical agglomeration processes involve the addition of inorganic and organic acids or anhydrides to facilitate agglomeration of small particles into larger particles, such as disclosed in U.S. Pat. Nos. 3,551,370 and 3,558,541, followed by stabilizing with an emulsifying agent. Generally, chemical agglomeration processes start with a latex that is formulated with a surfactant that coats the rubber particles to keep them dispersed. These chemical agglomeration processes involve pH reduction and application of heat, pressure and/or agitation. The reduction in pH results in destabilization of the surfactant coating from the small rubber particles allowing them to agglomerate to form larger rubber particles. Thereafter, a base is added to regenerate the surfactant, which then associates with or coats the larger agglomerated particles to stabilize the emulsion.

Other prior art agglomeration processes are reflected, for example, in U.S. Pat. No. 5,468,788, which is directed to a chemical process for agglomerating small rubber particles in an aqueous latex to form large rubber particles by addition of a water soluble organic acid and a water soluble organic anhydride to the rubber particles prior to agglomeration.

U.S. Pat. No. 5,847,050 is directed to a two-step, combined chemical and mechanical process for agglomeration of latex particles and formation of a graft copolymer using the enlarged particle latex. Agglomeration is stated to be caused mainly by Brownian coagulation and shear agglomeration through agitation wherein particles collide with each other. Agitation is conducted at a specific number of rotations represented by a mathematical relationship between the shape, size, and paddle type of the agitating element. Several agitation conditions are disclosed.

U.S. Pat. No. 6,080,803 is directed to a process for preparing coarse polymer dispersions comprising at least one conjugated diene monomer and at least one ethylenically unsaturated comonomer polymerized by free-radical aqueous emulsion polymerization in the presence of an emulsifier with or without other additives to form a fine polymer dispersion, which is thereafter agglomerated using a combination of chemical and pressure agglomeration. Chemical agglomeration is accomplished through addition of water-soluble or water-dispersible polymers to the fine polymer dispersion, followed by subjecting the mixture to high-pressure agglomeration through a homogenizer.

Traditional chemical agglomeration processes have disadvantages. It is a complex task to keep the latex stable and obtain larger particles without generating coagulum (masses of rubber). Coagulum is often formed due to process conditions involving, among other things, low pH, elevated temperature, agitation and additives. Coagulum can adversely affect the physical and mechanical properties of the final resin product or create obstacles in their manufacture. In addition, traditional agglomeration processes are often difficult to control in terms of producing particle sizes within specified ranges and distributions for certain applications. While many prior art processes result in larger particles, the particle size achieved is often not what is desired or particle size enlargement takes a very long time to achieve, which is not conducive to scale-up or commercial application. Prior art processes may also not be reproducible given the complexities of managing and maintaining process conditions.

A reproducible, controlled process for agglomeration of smaller rubber particles into larger rubber particles has been discovered that comprises using certain surfactants and adjustment of process conditions, such as pH and time, to permit the production of rubber particles having average particle sizes within a specified size and distribution range, with little or no waste, i.e., production of coagulum. The inventive process provides for agglomeration at a lower pH than that used in traditional processes through the use of specific organic or inorganic acids. The inventive process also provides for the use of a novel surfactant system consisting essentially of two different surfactants to stabilize rubber particles as they agglomerate. Both surfactants must be present in the small particle latex prior to pH reduction. With the reduction of pH, one surfactant is converted from its salt form to an acid form, leaving a second, dispersant surfactant, which is highly stable at low pH, to stabilize the rubber particles throughout the entire agglomeration process, resulting in the formation of less coagulum. At the end of the process, base is added, and the other surfactant is regenerated to facilitate stabilization of the larger rubber particles. Significantly, the inventive process proceeds without the temperature elevation, pressure and agitation requirements of the prior art.

It is an object of the invention to provide a process for the agglomeration of particles of synthetic latex, which controls particle size growth within a specified range and distribution.

It is a further object of the invention to provide a synthetic latex precursor formulation for use in agglomeration processes, comprising a latex in combination with select surfactants.

Still another object of the invention is to provide an agglomerated latex for use in a variety of products, wherein the particle size and distribution is tailored for specific applications through adjustment of process parameters.

Other objects of the invention will be apparent to one skilled in the art.

SUMMARY OF THE INVENTION

The present invention involves a method for agglomerating a synthetic latex comprising small rubber particles having a particle size in the range of (30 to <200 nanometers) to form an emulsion comprising larger rubber particles having particle sizes ranging from 200-450 nanometers. The method comprises the steps of: providing a synthetic latex comprising a two surfactant system that permits agglomeration of rubber particles at a lower pH than traditional processes (i.e., pH<4.5); lowering pH of the latex by adding organic or inorganic acids to destabilize one of the surfactants of the system; allowing smaller rubber particles of the latex to produce larger, agglomerated particles that remain dispersed by the use of an acid-stable surfactant; and stabilizing the large agglomerated rubber particles by the addition of a base to regenerate the other surfactant of the system.

The inventive method provides a way to produce a synthetic latex of large agglomerated rubber particles with little or no coagulum being produced, wherein the particle size achieved may be controlled within a specified range and distribution. The inventive agglomeration method proceeds without the use of elevated temperature or pressure or agitation as were used in traditional processes known in the art as described above.

The invention is also directed to an agglomerated latex prepared by the method of the invention.

In yet another aspect, the invention is directed to a synthetic latex precursor, comprising latex particles and a novel surfactant system for use in the production of agglomerated latex emulsions and resin products.

In still another embodiment, the invention is a resin product prepared utilizing the latex composition of the invention.

In one preferred embodiment, the invention is a method comprising:

a. providing a butadiene latex formulated with a natural surfactant;

b. adding an additional pH stable surfactant, to form a mixture;

c. reducing the pH of the latex/surfactant mixture by addition of an organic or inorganic acid;

d. agglomerating rubber particles over a set period of time at reduced pH;

e. stabilizing the agglomerated particles by the addition of base to regenerate the natural surfactant.

The inventive latex emulsion may be agglomerated in one step of a total process for producing polymer or copolymer based resins.

BRIEF DESCRIPTION OF THE DRAWINGS

FIG. 1 illustrates an embodiment of the inventive process components, steps and pH conditions throughout.

DETAILED DESCRIPTION OF THE INVENTION

The present invention is directed to a composition useful in agglomeration processes for converting small rubber particles to large rubber particles, wherein the particle size achieved during agglomeration is controlled within a specified range and distribution. The present invention is also directed to an agglomeration method useful for tailoring rubber particle sizes to specific applications. The present invention is also directed to resin products prepared utilizing the latex composition of the invention and the large rubber particles produced thereby.

As used in the invention, "soap" shall mean and include natural and synthetic surfactants of the novel surfactant system. "Soap" and "surfactant" are used interchangeably herein and include both the natural surfactants used to formulate the latex emulsion and the novel pH-stable surfactant additive.

The term "rubbers" shall mean and include natural or synthetic polymeric compounds, which may be dispersed in water to form an emulsion.

"Latex" or "latex emulsion" means and includes a dispersion of natural or synthetic polymeric compounds in water. In the present invention, "latex" is synonymous with "rubber".

"Agglomeration", as used in the present invention, means the control of particle size growth and distribution in a process wherein larger rubber particles are formed from the smaller particles of a latex.

"Coagulation", as used in the present invention, means uncontrolled particle growth in a process wherein larger rubber particles are formed from the smaller particles of a latex.

"Particle size" means and includes the average particle size (in nanometers) for the rubber particles of the initial latex or achieved through use of the agglomeration process.

"Distribution" or "particle size distribution" means and includes the sizes of particles that present and in what proportions (relative particle amount as a percentage, where the total amount of particles is 100%), in the sample particle group to be measured.

Various small rubber particle latex may be utilized in the inventive method. These rubbers include polymeric compounds such as 1,3-diene rubbers, ethylene-propylene-diene terpolymers, acrylate-diene interpolymer rubbers, polyisoprene rubbers, and mixtures thereof. Particularly preferred rubbers are those of 1,3-diene rubbers, such as butadiene, isoprene, chloroprene and the like. The rubber may be diene homopolymers or copolymers of dienes with one or more copolymerizable monoethylenically unsaturated monomers. Other useful polymers include: acrylonitrile, methacrylonitrile, styrene, α-methylstyrene, vinyltoluene, and vinylpyridine. Other useful polymers will be evident to one skilled in the art. Specific polymers utilized depend on the final end product and desired properties thereof.

Generally, the inventive composition comprises:

a latex formulated with a natural surfactant; and a novel surfactant additive that is pH (acid) stable.

Useful natural surfactants include potassium oleate, potassium dimerate and potassium rosinate. The pH (acid) stable surfactant additive includes sodium dodecylbenzene sulfonate and a novel naphthalene sulfonic acid condensate polymer with formaldehyde functionality, ammonium salt.

The inventive composition comprises synthetic latex present in amounts ranging from 15 to 60% total solids ("TS"), preferably 35 to 45% total solids. Typical latex emulsions are formulated with a natural surfactant present in amounts ranging from 0.1 to 5 parts per hundred weight of polymer. The pH (acid) stable surfactant additive is present in the inventive composition in amounts ranging from 0.1 to 50% by weight, based upon the weight of the synthetic latex.

Total solids ("TS") of the pH (acid) stable surfactant additive and grams and parts utilized are set forth in the examples.

The pH of the inventive latex emulsion composition prior to use in the inventive agglomeration method ranges from about 8 to about 14.

Emulsion polymerization of ethylenic monomers result in a latex having an average particle size of 50 to 150 nanometers. Utilizing the inventive method and inventive composition as described herein, the resultant latex was agglomerated to produce a new latex with a larger particle size between 200 and 450 nanometers with a monomodal distribution.

The inventive method comprises the steps of:

a. providing a synthetic latex emulsion formulated with a natural surfactant;

b. adding a novel pH (acid) stable surfactant additive to form a mixture;

c. reducing the pH of the mixture by addition of certain organic or inorganic acids to destabilize the natural surfactant and allow the particles to agglomerate;

d. allowing the pH-reduced mixture to sit without agitation for a period of time ranging from 0 to 12 hours during which agglomeration occurs;

e. adding a base to re-generate the natural surfactant.

The inventive method proceeds without application of heat or pressure or use of agitation techniques of traditional agglomeration processes.

Acids useful in the inventive method include: Phosphoric acid, polyphosphoric acid, sulfuric acid, sulfurous acid, hydrochloric acid or acetic acid. Acids added to the mixture are available commercially in concentrations of 38% to 100% by weight. Acids utilized in the inventive mixture in concentrations ranging from 0.1M to 10M, preferably ranging from about 1M to 2M.

During the agglomeration process, pH is reduced to a range of from about 5 to about 3.5, preferably from 3.25-3.75. The pH during the agglomeration process is lower than that utilized in known processes.

Advantageously, the inventive method may be utilized at ambient temperatures and without the need for agitation equipment or pressurizing the mixture as in prior art methods. The time period for optimal agglomeration ranges from about 0 to 48 hours, preferably from about 2 to 8 hours. The time of agglomeration is a critical factor, as times outside the recited ranges do not provide for consistently reproducible results or optimal average particle size. It was determined that monomodal particle size distributions were achieved if agglomeration times of less than 8 hours were maintained. At extended agglomeration times, polymodal particle size distributions occurred, which are less desirable.

After agglomeration has been achieved, the mixture is treated with base and the natural surfactant is regenerated. A schematic reflecting the inventive method is set forth in FIG. 1.

The invention is illustrated by the examples. The examples are not intended to limit the scope of the invention.

EXAMPLES

Test Methodology

Particle size was determined by the Dynamic Light Scattering (DLS) technique. A NICOMP™ 380 DLS was utilized and reported average and distribution using the Intensity-weighted average method.

Raw Materials Utilized

The following materials were utilized in the examples:

Butadiene Latex (BL), a synthetic latex utilized in the inventive method disclosed herein. BL's traditionally are formulated with a variety of surfactants including natural surfactants to stabilize the emulsion prior to agglomeration.

Potassium Oleate—a surfactant derived from oleic acid and potassium hydroxide

Rosinate—a surfactant derived from rosin acids and sodium hydroxide or potassium hydroxide. Potassium rosinate is used in the examples.

Dimer acid—a surfactant derived from covalently bonded $C_{10}$-$C_{22}$ carboxylic acids which are neutralized with ammonium hydroxide, sodium hydroxide or potassium hydroxide. Potassium dimerate is used in the examples.

Naphthalene sulfonic acid condensate polymer, with formaldehyde functionality, ammonium salt (W-307 in examples)—a new emulsifier available from GEO® Specialty Chemicals as Lomar® PWA liquid.

Sodium Dodecylbenzene sulfonate (W-59 in examples)

Acetic Acid—organic acid

Phosphoric Acid—inorganic acid

Example 1—Comparison of pH Stable Surfactant Additives

Variables that were modified in testing included surfactant parts, latex dilution, pH target and type of surfactant. BL used in Examples 1-3 was formulated with potassium oleate, a natural soap, unless otherwise specified. In this example, BL was further treated with acid stable surfactant additives (W-59 and W-307). W-59 was used in 9 of the 12 tests and W-307 (a new, naphthalene sulfonic acid condensate with formaldehyde functionality, ammonium salt) was used as an additional surfactant in the other 3 tests. Acetic acid was used as the acidifier to pH-reduce the emulsion to allow agglomeration to occur.

W-59 is desirable to use as it is stable at low pH and has a transparent color. After 120 hours, one W-307 sample was re-stabilized with 10% KOH to arrest particle size growth. Another W-307 sample had its pH reduced further to see if additional growth would occur.

Results are shown in the Tables below. TABLE 1 shows results of experiments utilizing the W-59 soap additive, while TABLE 2 shows results of the experiments with the W-307 soap additive, both using 1 M acetic acid. The W-307 group achieved higher particle (PS) size results.

TABLE 1

| BL w/W-59 and 1.0M Acetic Acid | | | | | | | | | |
|---|---|---|---|---|---|---|---|---|---|
| TS (total solids) W-59 Soap | 20% | 20% | 20% | 20% | 20% | 20% | 20% | 20% | 20% |
| TS (total solids) BL | 43.4% | 43.4% | 43.4% | 43.4% | 43.4% | 43.4% | 40% | 40% | 40% |
| BL (gm) | 230.4 | 230.4 | 230.4 | 230.4 | 230.4 | 230.4 | 250.0 | 250.0 | 250.0 |
| W-59 Soap (parts) | 0.25 | 0.75 | 1.25 | 0.25 | 0.75 | 1.25 | 0.25 | 0.75 | 1.25 |
| W-59 Soap (gm) | 1.25 | 3.75 | 6.25 | 1.25 | 3.75 | 6.25 | 1.25 | 3.75 | 6.25 |
| 1.0M Acetic Acid (gm) | 15 | 15 | 16 | 9 | 8 | 9 | 15 | 15 | 15 |
| pH (initial) | 8.55 | 8.55 | 8.62 | 8.54 | 8.55 | 8.63 | 8.49 | 8.56 | 8.61 |
| pH (final) | 5.00 | 5.00 | 5.00 | 6.00 | 6.00 | 6.00 | 5.00 | 5.00 | 5.00 |
| Comments | | | | | | | | | |
| PS (nm) (average) (start) | 119 | 119 | 119 | 119 | 119 | 119 | 119 | 119 | 119 |
| 1 hr. | | | | | | | | | |
| 24 hr. | | | | | | | | | |
| 48 hr. | | | | | | | | | |
| 72 hr. | 170 | 129 | 118 | 128 | 114 | 114 | 148 | 123 | 117 |
| 96 hr. | 167 | | | | | | | | |

TABLE 2

| BL w/W-307 and 1.0M Acetic Acid | | | |
|---|---|---|---|
| TS (total solids) W-307 Soap | 51.8% | 51.8% | 51.8% |
| TS (total solids) BL | 43.4% | 43.4% | 43.4% |
| BL (gm) | 230.4 | 230.4 | 230.4 |
| W-307 Soap (parts) | 1.30 | 2.60 | 3.90 |
| W-307 Soap (gm) | 2.50 | 5.00 | 7.50 |
| 1.0M Acetic Acid (gm) | 15 | 15 | 15 |
| pH (initial) | 8.38 | 8.32 | 8.28 |
| pH (final) | 5.00 | 5.00 | 5.00 |
| Comments | 10% KOH added to pH = 9.5 after 120 hours, PS growth arrested | pH taken to 4.75 after 120 hours | |
| PS (nm) average (start) | 119 | 119 | 119 |
| 1 hr. | | | |
| 24 hr. | | | |
| 48 hr. | | | |
| 72 hr. | 223 | 244 | 235 |
| 96 hr. | 213 | 245 | |
| 120 hr. | 221 | | |
| 144 hr. | 222 | 250 | |

Example 2—Soap Reduction

From Example 1, it was determined that lower amounts (parts) of soap correlated to higher average particle size with improved control of the rate and distribution of particle size.

A second round of experiments was run using less soap additive in efforts to determine the lowest effective level for the novel surfactant additive.

Acetic acid was still used as the acidifier, and variables, such as pH target, soap parts, acid concentration (1 M vs 2 M) and type of soap were evaluated. The goals were two-fold. The first goal was to achieve average particle sizes of 350, 300, 350 and 400 nm. The second goal was to prevent unacceptable levels of coagulated rubber during the agglomeration process. The first round of testing (Example 1) only achieved a maximum 250 nm average particle size. This round of tests was altered to achieve higher particle size targets. The experiments and results are shown below in TABLE 3. Some of the experiments with W-59 were repeated to measure reproducibility, and the results are shown in TABLE 4.

TABLE 3

| | BL w/W-59 and Acetic Acid #1 | | | | BL w/W-307 and Acetic Acid (1M) | |
|---|---|---|---|---|---|---|
| | 1M | 1M | 1M | 2M acetic | | |
| TS (Total solids) Soap | 20% | 20% | 20% | 20% | 47.6% | 47.6% |
| TS (Total solids) BL | 43.4% | 43.4% | 43.4% | 43.4% | 43.4% | 43.4% |
| BL (gm) | 230.4 | 230.4 | 230.4 | 230.4 | 230.4 | 230.4 |
| W-59 Soap (parts) | 0.01 | 0.10 | 0.10 | 0.10 | 0.01 | 0.10 |
| W-59 Soap (gm) | 0.05 | 0.50 | 0.50 | 0.50 | 0.02 | 0.21 |
| Acetic acid (gm) | 15 | 15 | 18 | 9 | | |
| pH (initial) | 8.39 | 8.40 | 8.35 | 8.39 | 8.39 | 8.39 |
| pH (final) | 5.00 | 5.00 | 4.80 | 4.80 | 5.00 | 5.00 |
| Comments | Some coag. on stirrer | Some coag. on stirrer | Some coag. on stirrer | Excessive coag. on stirrer | Some coag. on stirrer | Some coag. on stirrer |
| PS (nm) (average) (start) | 119 | 119 | 119 | 119 | 119 | 119 |
| 1 hr. | | | | | | |
| 24 hr. | | 212 | 184 | 204 | 231 | 211 | 185 |
| 48 hr. | | 235 | 207 | 231 | 242 | | |
| 72 hr. | | | | | | | |

TABLE 4

| | BL w/W-59 and Acetic Acid #2 | | | BL w/W-59 and Acetic Acid #3 | | |
|---|---|---|---|---|---|---|
| | 1M | 1M | 2M | 1M | 1M | 2M |
| TS (Total solids) Soap | 20% | 20% | 20% | 20% | 20% | 20% |
| TS (Total solids) BL | 43.4% | 43.4% | 43.4% | 43.4% | 43.4% | 43.4% |
| BL (gm) | 230.4 | 230.4 | 230.4 | 230.4 | 230.4 | 230.4 |
| W-59 (parts) | 0.01 | 0.10 | 0.10 | 0.01 | 0.10 | 0.10 |
| W-59 (gm) | 0.05 | 0.50 | 0.50 | 0.05 | 0.50 | 0.50 |
| Acetic acid (gm) | 15 | 18 | 9 | 15 | 18 | 9 |
| pH (initial) | 8.39 | 8.35 | 8.39 | 8.39 | 8.35 | 8.39 |
| pH (final) | 5.00 | 4.80 | 4.80 | 5.00 | 4.80 | 4.80 |
| Comments | Some coag on stirrer | Some coag on stirrer | Excessive coag on stirrer | Some coag on stirrer | Some coag on stirrer | Excessive coag on stirrer |
| PS (nm) (average) start 1 hr. | 119 | 119 | 119 | 119 | 119 | 119 |
| 24 hr. | 184 | 230 | 219 | 211 | 209 | 240 |
| 48 hr. | | | | | | |
| 72 hr. | | | | | | |

The results from this round of experiments reflected that there is a lower limit of soap additive beyond which particle size growth will not occur. As is reflected in the above Tables 3 and 4, the soap parts were lowered too far, which caused some coagulum to form on the stirrer thus affecting particle size growth. It was also noted that excess coagulum was produced if 2M acid concentration was used. Use of 1M acid solutions resulted in a more controlled process. The example is functional and defines undesired reaction at higher acid concentrations.

Example 3—pH Reduction Through Phosphoric Acid

It was found that the inventive formulation can be pH-reduced using phosphoric acid ($H_3PO_4$). The addition of $H_3PO_4$ allows the pH to be reduced to a lower level than traditional processes as compared to that achieved with acetic acid. The pKa of acetic acid is 4.75 compared to 2.15 for phosphoric acid. By dropping the BL latex to a lower pH, the average particle size (PS) achieved was larger because more surfactant molecules were destabilized. This destabilization allowed direct agglomeration of rubber particles and, therefore, a larger particle size was achieved.

The following experiment was set up to explore how various pH levels, soap concentrations, amount of acid, and types of surfactant affect the average particle (PS) achieved for the latex. The PS growth results are shown after 24 hours, after which most of the PS growth had already occurred.

W-59 was used in 8 of the 12 trials due to its cleanliness, clarity, and high stability, while W-307 was used in the other 4 trials. The experiments and results are shown below in Tables 5 and 6.

TABLE 5

| | BL w/W-307 and Phosphoric Acid | | | |
|---|---|---|---|---|
| | 1M | 1M | 1M | 2M |
| TS (Total solids) Soap | 47.6% | 47.6% | 47.6% | 47.6% |
| TS (Total solids) BL | 43.4% | 43.4% | 43.4% | 43.4% |
| BL (gm) | 230.4 | 230.4 | 230.4 | 230.4 |
| W-307 Soap (parts) | 0.20 | 0.34 | 0.50 | 0.50 |
| W-307 Soap (gm) | 0.42 | 0.74 | 1.05 | 1.05 |
| Phosphoric acid used (gm) | 12 | 12 | 12 | 12 |
| pH (initial) | 8.30 | 8.28 | 8.32 | 8.32 |
| pH (final) | 3.00 | 3.00 | 3.00 | 3.00 |
| Comments | Too much coag. | Clean | Clean | Clean |
| PS (nm) (average) (start) 1 hr. | 119 | 119 | 119 | 119 |
| 24 hr. | 345 | 284 | 251 | 281 |

TABLE 6

| | BL w/W-59 and Phosphoric Acid 1M | | | | | | | |
|---|---|---|---|---|---|---|---|---|
| TS (Total solids) Soap | 20% | 20% | 20% | 20% | 20% | 20% | 20% | 20% |
| TS (Total solids) BL | 43.4% | 43.4% | 43.4% | 43.4% | 43.4% | 43.4% | 43.4% | 43.4% |
| BL (gm) | 230.4 | 230.4 | 230.4 | 230.4 | 230.4 | 230.4 | 230.4 | 230.4 |
| W-59 Soap (parts) | 0.10 | 0.10 | 0.50 | 0.50 | 0.25 | 0.25 | 0.30 | 0.40 |
| W-59 Soap (gm) | 0.50 | 0.50 | 2.50 | 2.50 | 1.25 | 1.25 | 1.50 | 2.00 |
| Phosphoric acid used (gm) | 9 | — | 11 | 10 | 12 | 12 | 12 | 120 |
| pH (initial) | 8.18 | 8.18 | 8.39 | 8.39 | 8.39 | 8.35 | 8.33 | 8.36 |
| pH (final) | 3.50 | 4.50 | 3.50 | 4.50 | 3.00 | 3.50 | 3.00 | 3.00 |
| Comments | Too much coag to drop pH to 3.5, dropped to 5.5 | 0.1 parts was not sufficient to drop pH | | | | Medium coag | 10% KOH added to pH = 9.5 | |

TABLE 6-continued

| BL w/W-59 and Phosphoric Acid 1M | | | | | | | | |
|---|---|---|---|---|---|---|---|---|
| PS (nm)(average) (start) | 119 | 119 | 119 | 119 | 119 | 119 | 119 | 119 |
| 1 hr. | | | | | | | | |
| 24 hr. | 224 | — | 175 | 140 | 267 | 230 | 228 | 191 |

From the results above, it can be seen that use of W-307 rather than W-59 resulted in larger particle size as in Example 1. By using the BL formulated with W-307 and pH reduced by $H_3PO_4$, several higher average PS targets (250 nm to 300 nm) were achieved. The W-59 samples achieved the 200 nm average particle size target only. The W-59 sample that achieved up to 250 nm average PS had too much coagulum and was, therefore, unacceptable from an efficiency standpoint.

Example 4—Potassium Dimerate Formulated BL

Two alternative surfactants to potassium oleate were proposed to determine their effect on particle size after agglomeration. All previous BL compositions were made with potassium oleate as the primary stabilizing surfactant, but potassium dimerate and potassium rosinate are two natural surfactant alternatives. Both acetic acid and phosphoric acid were tested at various dispersant (surfactant) levels to determine the effect on particle size growth. The results are shown in Tables 7 and 8 below for potassium dimerate formulated BL.

TABLE 7

| Potassium Dimerate - BL | | | | |
|---|---|---|---|---|
| | BL w/W-307 and 1M Acetic Acid | | | |
| TS (Total solids) W307 | 47.6% | 47.6% | 47.6% | 47.6% |
| TS (Total solids) BL | 37.8% | 37.8% | 37.8% | 37.8% |
| BL (gm) | 264.6 | 264.6 | 264.6 | 264.6 |
| W-307 Soap (parts) | 0.0 | 0.1 | 0.50 | 1.00 |
| W-307 Soap (gm) | 0.0 | 0.21 | 1.05 | 2.10 |
| 1M Acetic (gm) | 10 | 10 | 10 | 10 |
| pH (initial) | 8.80 | 8.80 | 8.80 | 8.80 |
| pH (final) | 5.00 | 5.00 | 5.00 | 5.00 |
| Comments | Low coag. | Low coag. | Low coag. | Low coag. |
| PS (nm) (average) (start) | 99 | 99 | 99 | 99 |
| 1 hr. | 181 | 172 | 185 | 196 |
| 3 hr. | NA | NA | NA | NA |
| 24 hr. | 197 | 185 | 198 | 225 |
| 48 hr. | 197 | 188 | 198 | 231 |

TABLE 8

| Potassium Dimerate - BL | | | | |
|---|---|---|---|---|
| Potassium Dimerate BL | BL w/W-307 and 1M Phosphoric Acid | | | |
| TS (Total solids) W307 | 47.6% | 47.6% | 47.6% | 47.6% |
| TS (Total solids) BL | 37.8% | 37.8% | 37.8% | 37.8% |
| BL (gm) | 264.6 | 264.6 | 264.6 | 264.6 |
| W-307 Soap (parts) | 0.0 | 0.1 | 0.50 | 1.00 |
| W-307 Soap (gm) | 0.0 | 0.21 | 1.05 | 2.10 |
| 1M Phosphoric Acid (gm) | 12 | 12 | 12 | 12 |
| pH (initial) | 8.80 | 8.80 | 8.80 | 8.80 |
| pH (final) | 3.50 | 3.50 | 3.50 | 3.50 |
| Comments | High coag. | High coag. | Med/Low coag. | Low coag. |
| PS (nm) (average) (start) | 99 | 99 | 99 | 99 |
| 1 hr. | — | — | 277 | 216 |
| 3 hr. | — | — | 339 | 317 |
| 24 hr. | — | — | 361 | 367 |
| 48 hr. | — | — | 389 | 378 |

As seen from the data and observations, the BL agglomerated with acetic acid was low in coagulum, but did not produce high particle size (>350 nm). The phosphoric acid agglomerations had high coagulum with no W-307 addition, but at 1.0 parts of W-307 the material had low coagulum and reached a particle size of 367 nm after 24 hours of agglomeration. This demonstrates that potassium dimerate is a viable alternative surfactant to achieve large particle size in agglomerated latex.

Example 5—Rosinate Acid Formulated BL

As mentioned in Example 4, potassium rosinate may also be used in place of potassium oleate as the surfactant. For BL, potassium rosinate is a natural, pH-sensitive, soap used in other products. Two runs of BL were made using potassium rosinate as the surfactant. The first run achieved low particle size, so another run was made. The effect of acid type was evaluated and the results are shown below in Tables 9, 10, 11 and 12. Both acetic acid and phosphoric acid were tested against various ph-stable surfactant levels added to the latex. The average particle size was measured at 1, 24 and 48 hour intervals. The particle size target was 350 nm.

TABLE 9

| Potassium Rosinate BL | | | | |
|---|---|---|---|---|
| | BL w/W-307 and 1M Acetic Acid | | | |
| TS (Total solids) W307 | 47.6% | 47.6% | 47.6% | 47.6% |
| TS (Total solids) BL | 41.2% | 41.2% | 41.2% | 41.2% |
| BL (gm) | 242.7 | 242.7 | 242.7 | 242.7 |
| W-307 Soap (parts) | 0.0 | 0.1 | 0.50 | 1.00 |
| W-307 Soap (gm) | 0.0 | 0.21 | 1.05 | 2.10 |
| 1M Acetic Acid (gm) | 6.0 | 17 | 17 | 17 |
| pH (initial) | 8.50 | 8.50 | 8.50 | 8.50 |
| pH (final) | 5.00 | 5.00 | 5.00 | 5.00 |
| Comments | High coag. | Med/Low coag. | Low coag. | Low coag. |
| PS (nm) (average) (start) | 102 | 102 | 102 | 102 |
| 1 hr. | — | 289 | 215 | 213 |
| 24 hr. | — | 333 | 245 | 253 |
| 48 hr. | — | 339 | 256 | 249 |

TABLE 10

| Potassium Rosinate BL | | | | |
|---|---|---|---|---|
| | BL w/W-307 and 1M Phosphoric Acid | | | |
| TS (Total solids) W307 | 47.6% | 47.6% | 47.6% | 47.6% |
| TS (Total solids) BL | 41.2% | 41.2% | 41.2% | 41.2% |

TABLE 10-continued

Potassium Rosinate BL

| | BL w/W-307 and 1M Phosphoric Acid | | | |
|---|---|---|---|---|
| BL (gm) | 242.7 | 242.7 | 242.7 | 242.7 |
| W-307 Soap (parts) | 0.0 | 0.1 | 0.50 | 1.00 |
| W-307 Soap (gm) | 0.0 | 0.21 | 1.05 | 2.10 |
| 1M Phosphoric Acid (gm) | 15 | 15 | 15 | 15 |
| pH (initial) | 8.50 | 8.50 | 8.50 | 8.50 |
| pH (final) | 3.50 | 3.50 | 3.50 | 3.50 |
| Comments | High coag. | High coag. | Low coag. | Low coag. |
| PS (nm) (average) (start) | 102 | 102 | 102 | 102 |
| 1 hr. | — | — | 220 | 172 |
| 24 hr. | — | — | 243 | 192 |
| 48 hr. | — | — | 242 | 201 |

TABLE 11

Potassium Rosinate BL

| | BL w/W-307 and 1M Acetic Acid | | | |
|---|---|---|---|---|
| TS (Total solids) W307 | 47.6% | 47.6% | 47.6% | 47.6% |
| TS (Total solids) BL | 38.8% | 38.8% | 38.8% | 38.8% |
| BL (gm) | 257.7 | 257.7 | 257.7 | 257.7 |
| W-307 Soap (parts) | 0.0 | 0.1 | 0.50 | 1.00 |
| W-307 Soap (gm) | 0.0 | 0.21 | 1.05 | 2.10 |
| 1M Acetic Acid (gm) | 7 | 7 | 8 | 9 |
| pH (initial) | 8.10 | 8.10 | 8.10 | 8.10 |
| pH (final) | 5.00 | 5.00 | 5.00 | 5.00 |
| Comments | Med/Low coag. | Low coag. | Low/No coag. | Low/No coag. |
| PS (nm) (average) (start) | 124 | 124 | 124 | 124 |
| 1 hr. | 219 | 167 | 140 | 145 |
| 24 hr. | 240 | 182 | 155 | 146 |
| 48 hr. | — | — | 153 | — |

TABLE 12

Potassium Rosinate BL

| | BLE w/W-307 and 1M Phosphoric Acid | | | |
|---|---|---|---|---|
| TS (Total solids) W307 | 47.6% | 47.6% | 47.6% | 47.6% |
| TS (Total solids) BL | 38.8% | 38.8% | 38.8% | 38.8% |
| BL (gm) | 257.7 | 257.7 | 257.7 | 257.7 |
| W-307 Soap (parts) | 0.0 | 0.1 | 0.50 | 1.00 |
| W-307 Soap (gm) | 0.0 | 0.21 | 1.05 | 2.10 |
| 1M Phosphoric Acid (gm) | 6 | 6 | 6 | 6 |
| pH (initial) | 8.10 | 8.10 | 8.10 | 8.10 |
| pH (final) | 3.50 | 3.50 | 3.50 | 3.50 |
| Comments | High coag. | High coag. | Low coag. | Low coag. |
| PS (nm) (average) (start) | 124 | 124 | 124 | 124 |
| 1 hr. | — | — | 147 | 140 |
| 24 hr. | — | — | 154 | 140 |
| 48 hr. | — | — | — | — |

While in accordance with the Patent Statutes, the best mode and preferred embodiments have been set forth, the scope of the invention is not limited thereto, but rather, by the scope of the attached claims.

What is claimed is:

1. A method for agglomerating rubber particles, comprising:
   a. providing a latex emulsion formulated with a natural surfactant;
   b. adding an additional surfactant additive that is acid stable to the latex emulsion to form a mixture, wherein the acid stable surfactant comprises either sodium dodecyl benzene sulfonate or a naphthalene sulfonic acid condensate polymer, with formaldehyde functionality, ammonium salt;
   c. reducing the pH of the mixture to a range of about 5.0 to 3.5 by addition of an acid, wherein the acid comprises phosphoric acid, polyphosphoric acid, sulfuric acid, sulfurous acid, hydrochloric acid, or acetic acid;
   d. allowing the pH-reduced mixture to sit at room temperature with no agitation for a set period of time so that agglomerated rubber particles are formed; and
   e. stabilizing the agglomerated rubber particles with a base.

2. The method as set forth in claim 1, wherein the acid is phosphoric acid or acetic acid.

3. The method as set forth in claim 1 wherein the natural surfactant is potassium oleate, potassium rosinate or potassium dimerate.

4. The method as set forth in claim 1 wherein the acid stable surfactant is sodium dodecylbenzene sulfonate.

5. The method as set forth in claim 1 wherein the acid stable surfactant is a naphthalene sulfonic acid condensate polymer, with formaldehyde functionality, ammonium salt.

6. A method for agglomerating rubber particles, comprising:
   a. providing a latex emulsion formulated with a natural surfactant, wherein the latex emulsion comprises a polymeric compound that is a homopolymer or copolymer of a 1,3-diene rubber, ethylene-propylene-diene terpolymer, acrylate-diene interpolymer rubber, polyisoprene rubber, or mixtures thereof;
   b. adding an additional surfactant that is acid stable to the latex emulsion to form a mixture, wherein the additional surfactant comprises either sodium dodecyl benzene sulfonate or a naphthalene sulfonic acid condensate polymer, with formaldehyde functionality, ammonium salt;
   c. reducing the pH of the mixture to a range of about 5.0 to 3.5, by adding an acid, wherein the acid comprises phosphoric acid, polyphosphoric acid, sulfuric acid, sulfurous acid, hydrochloric acid, or acetic acid;
   d. allowing the pH-reduced mixture to sit at room temperature with no application of pressure or agitation for a set period of time for agglomeration of rubber particles; and
   e. stabilizing the agglomerated rubber particles with a base.

7. The method as set forth in claim 6, wherein the polymeric compound is butadiene, isoprene, chloroprene, acrylonitrile, methacrylonitrile, styrene, α-methylstyrene, vinyltoluene, or vinylpyridine.

8. A method for agglomerating rubber particles, comprising:
   a. providing a butadiene latex emulsion formulated with a natural surfactant, wherein the natural surfactant is potassium oleate, potassium rosinate or potassium dimerate;
   b. adding an acid stable surfactant that is a naphthalene sulfonic acid condensate polymer, with formaldehyde functionality, ammonium salt to the latex emulsion to form a mixture;
   c. reducing the pH of the mixture to about 4.5 to 3.0 by adding phosphoric acid or acetic acid;
   d. allowing the pH-reduced mixture to sit at room temperature with no application of pressure or agitation for a set period of time for agglomeration of rubber particles; and e. stabilizing the agglomerated butadiene particles with a base.

9. An agglomerated rubber particle product made by the method of claim 8.

10. An agglomerated rubber particle product made by the method of claim 6.

* * * * *